US010668390B2

(12) United States Patent
Stine et al.

(10) Patent No.: US 10,668,390 B2
(45) Date of Patent: *Jun. 2, 2020

(54) SUSPENDING STATE OF CLOUD-BASED LEGACY APPLICATIONS

(71) Applicant: Sony Interactive Entertainment Inc., Tokyo (JP)

(72) Inventors: Jacob P. Stine, East Palo Alto, CA (US); Brian Michael Christopher Watson, San Mateo, CA (US); Victor Octav Suba Miura, Foster City, CA (US); Nicholas J. Cardell, Foster City, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 43 days.

This patent is subject to a terminal disclaimer.

(21) Appl. No.: 15/937,531

(22) Filed: Mar. 27, 2018

(65) Prior Publication Data
US 2019/0099680 A1    Apr. 4, 2019

Related U.S. Application Data

(63) Continuation of application No. 13/791,379, filed on Mar. 8, 2013, now Pat. No. 9,925,468.
(Continued)

(51) Int. Cl.
*A63F 13/88* (2014.01)
*A63F 13/49* (2014.01)
*A63F 13/60* (2014.01)

(52) U.S. Cl.
CPC .............. *A63F 13/88* (2014.09); *A63F 13/49* (2014.09); *A63F 13/60* (2014.09); *A63F 2300/209* (2013.01)

(58) Field of Classification Search
CPC .. A63F 13/12; A63F 13/355; A63F 2300/538; A63F 13/49; A63F 13/60; A63F 13/88; G06F 2209/549
See application file for complete search history.

(56) References Cited

U.S. PATENT DOCUMENTS 6,009,458 A   12/1999  Hawkins et al.
6,115,054 A    9/2000  Giles
(Continued)

FOREIGN PATENT DOCUMENTS

CN    1192013 A      9/1998
CN    101346162 B    3/2012
(Continued)

OTHER PUBLICATIONS

Non-Final Office Action for U.S. Appl. No. 13/631,785, dated May 21, 2015.
(Continued)

*Primary Examiner* — David L Lewis
*Assistant Examiner* — Robert E Mosser
(74) *Attorney, Agent, or Firm* — JCI Patent; Joshua Isenberg; Robert Pullman

(57) ABSTRACT

A snapshot of a game may be generated by a client. At some point, a suspension request is delivered to a computer system. Once the suspension request is received, the computer system will suspend the emulated title. The computer system generates a snapshot of the game by recording the current state of all devices being emulated. The snapshot is then delivered to the client. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

17 Claims, 5 Drawing Sheets

Related U.S. Application Data

(60) Provisional application No. 61/666,679, filed on Jun. 29, 2012.

(56) References Cited

U.S. PATENT DOCUMENTS

| | | |
|---|---|---|
| 6,267,673 B1 | 7/2001 | Miyamoto et al. |
| 6,280,323 B1 | 8/2001 | Yamazaki et al. |
| 6,402,620 B1 | 6/2002 | Naghi |
| 6,699,127 B1 | 3/2004 | Lobb et al. |
| 7,159,008 B1 | 1/2007 | Wies et al. |
| 7,286,132 B2 | 10/2007 | Kuhne |
| 7,470,196 B1 | 12/2008 | Joshi |
| 7,493,365 B2 | 2/2009 | Wies et al. |
| 7,577,826 B2 | 8/2009 | Suba |
| 7,782,327 B2 | 8/2010 | Gonzalez et al. |
| 7,841,946 B2 | 11/2010 | Walker et al. |
| 8,267,796 B2 | 9/2012 | Iwakiri |
| 8,321,571 B2 | 11/2012 | Crowder, Jr. et al. |
| 8,661,496 B2 | 2/2014 | Perlman et al. |
| 8,935,487 B2 | 1/2015 | Sengupta et al. |
| 9,248,374 B2 | 2/2016 | Watson et al. |
| 9,258,012 B2 | 2/2016 | Miura |
| 9,694,276 B2 | 7/2017 | Stine et al. |
| 9,849,372 B2 | 12/2017 | Stine et al. |
| 9,925,468 B2 | 3/2018 | Stine et al. |
| 10,293,251 B2 | 5/2019 | Stine et al. |
| 2001/0031665 A1 | 10/2001 | Taho et al. |
| 2002/0002510 A1 | 1/2002 | Sharp et al. |
| 2002/0004584 A1 | 1/2002 | Laughlin |
| 2002/0045484 A1 | 4/2002 | Eck et al. |
| 2002/0065915 A1 | 5/2002 | Anderson et al. |
| 2003/0037030 A1 | 2/2003 | Dutta et al. |
| 2003/0061279 A1 | 3/2003 | Llewellyn et al. |
| 2003/0190950 A1 | 10/2003 | Matsumoto |
| 2003/0225560 A1 | 12/2003 | Garcia et al. |
| 2004/0179019 A1 | 9/2004 | Sabella et al. |
| 2004/0224772 A1 | 11/2004 | Canessa et al. |
| 2004/0266529 A1 | 12/2004 | Chatani |
| 2005/0195187 A1 | 9/2005 | Seiler et al. |
| 2005/0261062 A1 | 11/2005 | Lewin et al. |
| 2005/0288954 A1 | 12/2005 | McCarthy et al. |
| 2006/0009290 A1 | 1/2006 | Taho et al. |
| 2006/0046819 A1 | 3/2006 | Nguyen et al. |
| 2006/0080702 A1 | 4/2006 | Diez et al. |
| 2006/0117260 A1 | 6/2006 | Sloo et al. |
| 2006/0146057 A1 | 7/2006 | Blythe |
| 2006/0148571 A1 | 7/2006 | Hossack et al. |
| 2006/0160626 A1 | 7/2006 | Gatto et al. |
| 2006/0259292 A1 | 11/2006 | Solomon et al. |
| 2007/0060361 A1 | 3/2007 | Nguyen et al. |
| 2007/0298866 A1 | 12/2007 | Gaudiano et al. |
| 2008/0032794 A1 | 2/2008 | Ware et al. |
| 2008/0113749 A1 | 5/2008 | Williams et al. |
| 2008/0263527 A1 | 10/2008 | Miura |
| 2008/0282241 A1 | 11/2008 | Dong |
| 2008/0300053 A1 | 12/2008 | Muller |
| 2009/0082102 A1 | 3/2009 | Sargaison et al. |
| 2009/0088236 A1 | 4/2009 | Laude et al. |
| 2009/0094600 A1 | 4/2009 | Sargaison et al. |
| 2009/0098943 A1 | 4/2009 | Weber et al. |
| 2009/0131177 A1 | 5/2009 | Pearce |
| 2009/0162029 A1 | 6/2009 | Glen |
| 2009/0282139 A1 | 11/2009 | Mejdrich et al. |
| 2009/0303245 A1 | 12/2009 | Soupikov et al. |
| 2010/0088296 A1 | 4/2010 | Periyagaram et al. |
| 2010/0167809 A1 | 7/2010 | Perlman et al. |
| 2010/0214301 A1 | 8/2010 | Li et al. |
| 2010/0250650 A1 | 9/2010 | Allen |
| 2010/0259536 A1 | 10/2010 | Toksvig et al. |
| 2011/0013699 A1 | 1/2011 | Persson |
| 2011/0098111 A1 | 4/2011 | Saito et al. |
| 2011/0218037 A1 | 9/2011 | Singh |
| 2011/0276661 A1 | 11/2011 | Gujarathi et al. |
| 2011/0299105 A1 | 12/2011 | Morrison et al. |
| 2012/0021840 A1 | 1/2012 | Johnson et al. |
| 2012/0052930 A1 | 3/2012 | Mcgucken |
| 2012/0142425 A1 | 6/2012 | Scott et al. |
| 2012/0299940 A1 | 11/2012 | Dietrich et al. |
| 2013/0137518 A1 | 5/2013 | Lucas |
| 2013/0165233 A1 | 6/2013 | Wada |
| 2014/0004941 A1 | 1/2014 | Christopher Watson et al. |
| 2014/0004949 A1 | 1/2014 | Miura et al. |
| 2014/0004956 A1 | 1/2014 | Miura et al. |
| 2014/0004957 A1 | 1/2014 | Stine et al. |
| 2014/0004962 A1 | 1/2014 | Miura et al. |
| 2014/0066177 A1 | 3/2014 | Zalewski |
| 2014/0092087 A1 | 4/2014 | Kazama et al. |
| 2014/0094299 A1 | 4/2014 | Stine et al. |
| 2014/0094313 A1 | 4/2014 | Watson et al. |
| 2014/0094314 A1 | 4/2014 | Watson et al. |
| 2014/0094315 A1 | 4/2014 | Stine et al. |
| 2017/0312639 A1 | 11/2017 | Watson et al. |
| 2017/0312640 A1 | 11/2017 | Watson et al. |

FOREIGN PATENT DOCUMENTS

| | | |
|---|---|---|
| CN | 101889442 B | 10/2014 |
| EP | 1172132 A2 | 1/2002 |
| EP | 1225767 A2 | 7/2002 |
| EP | 2039404 A2 | 3/2009 |
| EP | 2040163 A1 | 3/2009 |
| JP | 2009072601 A | 4/2009 |
| JP | 2012034793 A | 2/2012 |
| RU | 2364938 C2 | 8/2009 |
| WO | 2004024259 A | 3/2004 |
| WO | 2014052205 A1 | 4/2014 |

OTHER PUBLICATIONS

Non-Final Office Action for U.S. Appl. No. 13/631,785, dated Nov. 3, 2016.
Non-Final Office Action for U.S. Appl. No. 13/631,803, dated Sep. 17, 2015.
Non-Final Office Action for U.S. Appl. No. 13/631,812, dated Jan. 18, 2017.
Non-Final Office Action for U.S. Appl. No. 13/790,311, dated Nov. 19, 2015.
Non-Final Office Action for U.S. Appl. No. 13/790,320, dated Jul. 28, 2015.
Non-Final Office Action for U.S. Appl. No. 13/791,379, dated Jul. 1, 2016.
Non-Final Office Action for U.S. Appl. No. 13/791,420, dated Apr. 9, 2015.
Non-Final Office Action for U.S. Appl. No. 14/183,351, dated May 11, 2015.
Non-Final Office Action for U.S. Appl. No. 15/019,891, dated May 6, 2016.
Non-Final Office Action for U.S. Appl. No. 15/225,361, dated Oct. 21, 2016.
Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
Non-Final/Final Office Action for U.S. Appl. No. 13/792,664, dated Apr. 3, 2018.
Notice of Allowance for U.S. Appl. No. 13/631,812, dated Aug. 9, 2017.
Notice of Allowance for U.S. Appl. No. 13/791,379, dated Nov. 9, 2017.
Notice of Allowance for U.S. Appl. No. 15/640,483, dated Jan. 17, 2019.
Notice of Allowance for U.S. Appl. No. 13/631,725, dated Oct. 6, 2015.
Notice of Allowance for U.S. Appl. No. 131631,740, dated Mar. 16, 2017.
Notice of Allowance for U.S. Appl. No. 13/631,785, dated Feb. 27, 2017.

(56) References Cited

OTHER PUBLICATIONS

Notice of Allowance for U.S. Appl. No. 13/790,311, dated Mar. 30, 2017.
Notice of Allowance for U.S. Appl. No. 13/790,320, dated Dec. 5, 2016.
Notice of Allowance for U.S. Appl. No. 14/183,351, dated Oct. 5, 2015.
Notice of Allowance for U.S. Appl. No. 15/019,891, dated Jan. 26, 2017.
PCT International Search Report and Written Opinion for International Application No. PCT/US2013/061023, dated Jan. 23, 2014.
PCT International Search Report and Written Opinion for International Application No. PCT/US2013/061029, dated Jan. 23, 2014.
Playstation2, 2004, Grand Theft Auto—San Andreas.
U.S. Appl. No. 13/631,725, entitled "Replay and Resumption of Suspended Game" to Brian Michael Christopher Watson et al., filed Sep. 28, 2012.
U.S. Appl. No. 13/631,740, entitled "Method for Creating a Mini-Game" to Brian Michael Christopher Watson et al., filed Sep. 28, 2012.
U.S. Appl. No. 13/631,785, entitled "Pre-Loading Translated Code in Loud Based Emulated Applications" to Jacob P. Stine et al., filed Sep. 28, 2012.
U.S. Appl. No. 13/631,803, entitled "Adaptive Load Balancing in Software Emulation of GPU Hardware", to Takayuki Kazama and Victor Octav Suba Miura, filed Sep. 28, 2012.
U.S. Appl. No. 13/631,812, entitled "Method and Apparatus for Improving Efficiency Wihout Increasing Latentcy in Emulation of a Legacy Application Title" to Jacob P. Stine et al., filed Sep. 28, 2012.
U.S. Appl. No. 13/790,320, entitled "Determining Triggers for Cloud-Based Emulated Games" to Victor Octav Suba Miura et al., filed Mar. 8, 2013.
U.S. Appl. No. 61/666,628, entitled "Adding Triggers to Cloud-Based Emulated Games" to Victor Octav Suba Miura et al., filed Jun. 30, 2013.
U.S. Appl. No. 61/666,645, entitled "Haptic Enhancements for Emulated Video Game Not Originally Designed With Haptic Capabilities" to Victor Octav Suba Miura, et al., filed Jun. 29, 2012.
U.S. Appl. No. 61/666,665, entitled "Conversion of Haptic Events Into Screen Events" to Brian Michael, et al., filed Jun. 30, 2013.
U.S. Appl. No. 61/666,628, to Victor Octav Suba Miura, filed Jun. 29, 2012.
U.S. Appl. No. 61/666,645, to Victor Octav Suba Miura, filed Jun. 29, 2012.
U.S. Appl. No. 61/666,665, to Brian Michael Christopher Watson, filed Jun. 29, 2012.
U.S. Appl. No. 61/666,679, to Jacob P. Stine, filed Jun. 29, 2012.
U.S. Appl. No. 61/694,718, to Gary M. Zalewski, filed Aug. 29, 2012.
U.S. Appl. No. 61/794,811, to Victor Octav Suba Miura, filed Mar. 15, 2013.
Chinese Office Action for CN Application No. 201380045408.4, dated Sep. 20, 2016.
Communication under EPC Rule 94(3) dated Apr. 23, 2018 in European Patent Application No. 13881307.6.
European Search Report and Written Opinion for EP Application No. 13841130.1, dated Oct. 4, 2016.
European Search Report and Written Opinion for European Application No. PCT/US2013/047856, dated Jul. 28, 2016.
Final Office Action for U.S. Appl. No. 15/650,729, dated Jan. 7, 2019.
Final Office Action for U.S. Appl. No. 15/650,m755, dated Jan. 7, 2019.
Final Office Action for U.S. Appl. No. 13/631,725, dated Dec. 19, 2014.
Final Office Action for U.S. Appl. No. 13/631,740, dated Jul. 27, 2015.
Final Office Action for U.S. Appl. No. 13/631,785, dated Dec. 4, 2015.
Final Office Action for U.S. Appl. No. 13/631,803, dated Feb. 1, 2016.
Final Office Action for U.S. Appl. No. 13/631,812, dated Aug. 29, 2014.
Final Office Action for U.S. Appl. No. 13/790,311, dated Jul. 15, 2016.
Final Office Action for U.S. Appl. No. 13/790,320, dated Feb. 10, 2016.
Final Office Action for U.S. Appl. No. 13/790,320, dated Jan. 15, 2015.
Final Office Action for U.S. Appl. No. 13/791,379, dated May 13, 2015.
Final Office Action for U.S. Appl. No. 13/791,420, dated Jun. 11, 2014.
Final Office Action for U.S. Appl. No. 13/791,420, dated Oct. 9, 2015.
Final Office Action for U.S. Appl. No. 13/791,434, dated Feb. 17, 2016.
Final Office Action for U.S. Appl. No. 13/791,434, dated Jun. 23, 2015.
Final Office Action for U.S. Appl. No. 15/019,891, dated Oct. 19, 2016.
Final Office Action for U.S. Appl. No. 13/631,803, dated Apr. 16, 2015.
Final Office Action for U.S. Appl. No. 13/790,311, dated Mar. 27, 2015.
First Examinitaion Report dated Feb. 23, 2018 for Indian Patent Application 3524/CHE/2013.
Grand Theft Auto: San Andreas Guide—Territories, https://www.youtube.com/watch?v=5d2GY-gr, May 29, 2012.
GTA San Andreas How to start a gang war, https://www.youtube.com/watch?v=9N4908kGtLO, Jan. 13, 2013.
International Search Report and Written Opinion for International Application No. PCT/US2013/074813, dated May 29, 2014.
Japanese Office Action for Japan Code Application No. 2015-517495, dated Feb. 9, 2016.
Non-Final Office Action dated Apr. 21, 2017 for U.S. Appl. No. 13/791,379.
Non-Final Office Action for U.S. Appl. No. 13/790,311, dated Jun. 27, 2013.
Non-Final Office Action for U.S. Appl. No. 13/631,725, dated Mar. 16, 2015.
Non-Final Office Action for U.S. Appl. No. 13/631,725, dated Sep. 12, 2014.
Non-Final Office Action for U.S. Appl. No. 13/631,740, dated Oct. 21, 2014.
Non-Final Office Action for U.S. Appl. No. 13/631,812, dated Jun. 3, 2016.
Non-Final Office Action for U.S. Appl. No. 13/631,812, dated Mar. 28, 2014.
Non-Final Office Action for U.S. Appl. No. 13/790,311, dated Feb. 26, 2014.
Non-Final Office Action for U.S. Appl. No. 13/790,311,dated Sep. 9, 2014.
Non-Final Office Action for U.S. Appl. No. 13/790,320, dated Jun. 18, 2014.
Non-Final Office Action for U.S. Appl. No. 13/791,379, dated Mar. 27, 2014.
Non-Final Office Action for U.S. Appl. No. 13/791,420, dated Mar. 27, 2014.
Non-Final Office Action for U.S. Appl. No. 13/792,664, dated. Dec. 6, 2018.
Non-Final Office Action for U.S. Appl. No. 13/792,664, dated Jun. 23, 2014.
Non-Final Office Action for U.S. Appl. No. 15/640,483, dated Oct. 4, 2018.
Non-Final Office Action for U.S. Appl. No. 15/650,729, dated Aug. 2, 2018.
Non-Final Office Action for U.S. Appl. No. 15/650,755, dated Aug. 2, 2018.
Non-Final Office Action for U.S. Appl. No. 15/838,065, dated Nov. 7, 2018.

(56) References Cited

OTHER PUBLICATIONS

Non-Final Office Action for U.S. Appl. No. 13/792,664., dated Jul. 31, 2017.
Non-Final Office Action for U.S. Appl. No. 13/791,434, dated Nov. 26, 2014.
Non-Final Office Action for U.S. Appl. No. 13/631,740, dated Feb. 27, 2015.
Non-Final Office Action for U.S. Appl. No. 13/631,740, dated Sep. 30, 2016.
Notice of Allowance for U.S. Appl. No. 13/792,664, dated Apr. 26, 2019.
Notice of Allowance for U.S. Appl. No. 15/650,755, dated Aug. 23, 2019.
Notice of Allowance for U.S. Appl. No. 15/838,065, dated Feb. 25, 2019.
Notice of Allowance for U.S. Appl. No. 15/838,065, dated Jun. 12, 2019.
Notice of Allowance for U.S. Appl. No. 16/650,729, dated Aug. 22, 2019.

SUSPENDING STATE OF CLOUD-BASED LEGACY APPLICATIONS

CLAIM OF PRIORITY

This application is a continuation of U.S. patent application Ser. No. 13/791,379, filed Mar. 8, 2013, the entire disclosures of which are incorporated herein by references. U.S. patent application Ser. No. 13/791,379 claims the priority benefit of U.S. Provisional Patent Application No. 61/666,679 filed Jun. 29, 2012, the entire disclosures of which are incorporated herein by reference.

CROSS-REFERENCE TO RELATED APPLICATION

This application is related to commonly-assigned, provisional application Ser. No. 61/666,628, filed Jun. 29, 2012, and entitled "DETERMINING TRIGGERS FOR CLOUD-BASED EMULATED GAMES", the entire disclosures of which are incorporated herein by reference.

This application is related to commonly-assigned, provisional application Ser. No. 61/666,645, filed Jun. 29, 2012, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, provisional application Ser. No. 61/666,665, filed Jun. 29, 2012, and entitled "CONVERSION OF HAPTIC EVENTS INTO SCREEN EVENTS", the entire disclosures of which are incorporated herein by reference.

FIELD OF THE DISCLOSURE

The present disclosure is related to video game emulation. Among other things, this application describes a method and apparatus for emulating a video game that includes generating snapshots that can be used for incorporating new content into the emulated video games.

BACKGROUND OF THE INVENTION

Finding new ways to play preexisting video games can increase the longevity of older games. Instead of replaying the same level or completing the same missions repeatedly, gamers often desire new challenges when replaying legacy games. In response to this need, game designers have begun to produce mini-games. Within a mini-game, the gamer can be instructed to complete new objectives or challenge their friends for high scores in a format that was not originally designed into the legacy game. Further, since the mini-game is derived from a legacy game, the gamer already knows the characters and basic components of the game, and is therefore more likely to play the mini-game.

Mini-games often do not begin at traditional starting points that were used in the original game. For example, the mini-game may begin near the end of a level, just prior to facing a final opponent, or the boss of the level. A boss is an enemy-based challenge which is found in many video games. Bosses are generally seen at the climax of a particular section of the game, usually at the end of a stage or level. Due to the climactic nature of fighting a boss, mini-game designers may choose to use this section of the game as their starting point. In order to make the mini-game more challenging than the original version, the game designer may also want to limit the number of lives a player may use, or change other game parameters such as the amount of health the main character has remaining. Other game scenarios may be chosen as starting points for a min-game. For example a mini-game may begin with the game player being the batter in a baseball game where there are two outs in the bottom of the ninth inning and the batter's team is down by one run.

However, in order to generate mini-games that start with these specific circumstances a game designer must reverse engineer the underlying code in each game and then rewrite the code to enable the mini-game to start under these specific conditions. This process is time consuming and expensive, because it may require multiple engineers to redevelop a single legacy game. Additionally since mini-games are shorter than full-length games, there is a need to produce mini-games in larger quantities.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

In order to create mini-games without reverse engineering and recoding a game designer may rely on the use of triggers and snapshots to provide information needed for the mini-games without having to dig into the code of the legacy game. Triggers are further described in commonly assigned application Ser. No. 61/666,628 filed the same day as the present application and entitled "DETERMINING TRIGGERS FOR CLOUD-BASED EMULATED GAMES". The mini-games may be made by providing an emulator with game inputs that bring the emulated game to a certain point where the mini-game will begin. A snapshot may be generated according to aspects of the present disclosure and that point may be used as the used as the starting point in the future mini-game. Thereafter, triggers may be generated in order to provide new experiences for the game. Game designers may then develop a script and combine it with the snapshot and triggers to produce the mini-game. Therefore, in order to design mini-games in this manner, there is a need in the art for a method of quickly generating snapshots.

A snapshot may be a recorded description of the state of every device being emulated at a designated time during the emulation according to an aspect of the present disclosure. A snapshot may be generated by a client. First the client delivers game inputs to an emulator. The emulator receives the game inputs and proceeds to emulate the game according to the game inputs. At some point during the emulation, the client delivers a suspension request to the emulator. Once the suspension request is received, the emulator will suspend the emulated title at the next point in time at which all devices being emulated are in a steady state. As used herein, steady state means that there are no asynchronous activities occurring in the emulator. At this steady state, the emulator generates a snapshot of the emulated game by recording the current state of all devices being emulated. The snapshot is then delivered to the client.

Figure 1:
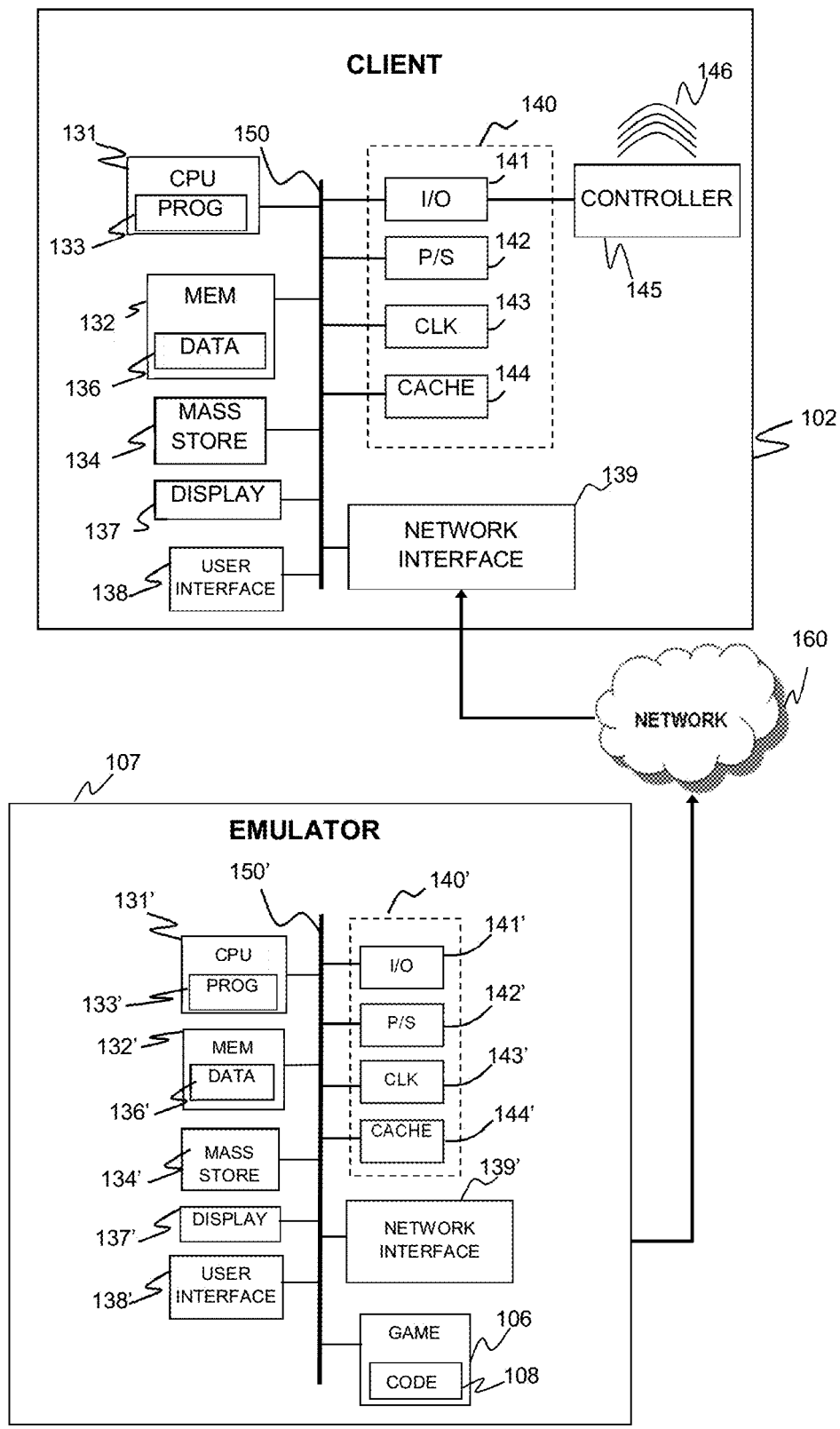
FIG. 1 is a schematic diagram of a client and an emulator communicating over a network according to an aspect of the present disclosure.

FIG. 1A is a schematic of an embodiment of the present invention. Emulator 107 may be accessed by a client 102 over a network 160. Client 102 may access alternative emulators 107 over the network 160. Emulators 107 may be identical to each other, or they may each be programed to emulate unique legacy game titles 106 or unique sets of legacy game titles 106. Additionally, the client 102 may be contained within the emulator 107 and may communicate directly with the emulator over an internal system bus 150'

Client 102 may include a central processor unit (CPU) 131. By way of example, a CPU 131 may include one or more processors, which may be configured according to, e.g., a dual-core, quad-core, multi-core, or Cell processor architecture. Client 102 may also include a memory 132 (e.g., RAM, DRAM, ROM, and the like). The CPU 131 may execute a process-control program 133, portions of which may be stored in the memory 132. The client 102 may also include well-known support circuits 140, such as input/output (I/O) circuits 141, power supplies (P/S) 142, a clock (CLK) 143 and cache 144. The client 102 may optionally include a mass storage device 134 such as a disk drive, CD-ROM drive, tape drive, or the like to store programs and/or data. The client 102 may also optionally include a display unit 137 and a user interface unit 138 to facilitate interaction between the client 102 and a user who requires direct access to the client 102. The display unit 137 may be in the form of a cathode ray tube (CRT) or flat panel screen that displays text, numerals, or graphical symbols. The user interface unit 138 may include a keyboard, mouse, joystick, light pen, or other device. A controller 145 may be connected to the client 102 through the I/O circuit 141 or it may be directly integrated into the client 102. The controller 145 may facilitate interaction between the client 102 and a user. The controller 145 may include a keyboard, mouse, joystick, light pen, hand-held controls or other device. The controller 145 is also may be capable of generating a haptic response 146. By way of example and not by way of limitation, the haptic response 146 may be vibrations or any other feedback corresponding to the sense of touch. The client 102 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client 102 may send and receive data and/or requests for files via one or more data packets over the network 160.

The preceding components may exchange signals with each other via an internal system bus 150. The client 102 may be a general purpose computer that becomes a special purpose computer when running code that implements embodiments of the present invention as described herein.

The emulator 107 may include a central processor unit (CPU) 131'. By way of example, a CPU 131' may include one or more processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a client or engineer 102 may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a legacy game 106 that has been selected by the client 102 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109.

By way of example, a legacy game 106 may be any game that is not compatible with a target platform. By way of example and not by way of limitation, the legacy game 106 may have been designed to be played on Sony Computer Entertainment's PlayStation console, but the target platform is a home computer. By way of example, the legacy game 106 may have been designed to be played on a PlayStation 2 console, but the target platform is a PlayStation 3 console. Further, by way of example and not by way of limitation, a legacy game 106 may have been designed to be played on a PlayStation console, but the target platform is a hand held console such as the PlayStation Vita from Sony Computer Entertainment.

Emulator 107 may be a deterministic emulator. A deterministic emulator is an emulator that may process a given set of game inputs 347 the same way every time that the same set of inputs 347 are provided to the emulator 107. This may be accomplished by eliminating any dependencies in the code run by the emulator 107 that depend from an asynchronous activity. Asynchronous activities are events that occur independently of the main program flow. This means that actions may be executed in a non-blocking scheme in order to allow the main program flow to continue processing. Therefore, by way of example, and not by way of limitation, the emulator 107 may be deterministic when the dependencies in the code depend from basic blocks that always begin and end with synchronous activity. By way of example, basic blocks may be predetermined increments of code at which the emulator 107 checks for external events or additional game inputs 347. The emulator 107 may also wait for anything that runs asynchronously within a system component to complete before proceeding to the next basic block. A steady state within the emulator 107 may be when all of the basic blocks are in lock step.

Figure 2:
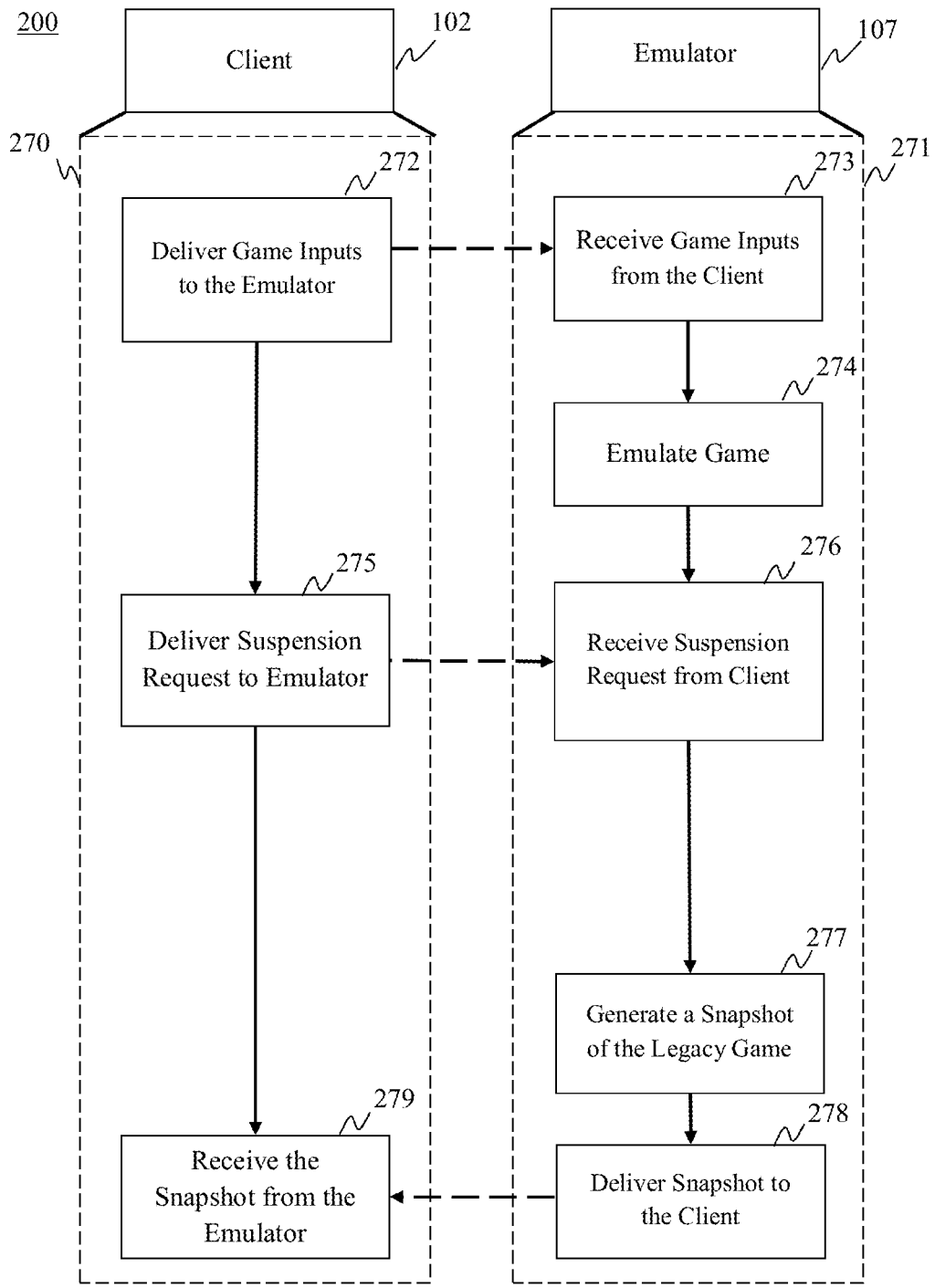
FIG. 2 is a flow diagram illustrating a method of producing a snapshot for an emulated game according to an aspect of the present disclosure.

As shown in FIG. 2, the emulator 107 may be configured to implement a method for generating a snapshot of an emulated legacy game 106 according to an inventive method 200. Various aspects of the method 200 may be implemented by execution of computer executable instructions running on the client 102 and/or the emulator 107 in conjunction with the actions of a client 102. Specifically, a client 102 may be configured, e.g., by suitable programming, to implement certain client device platform instructions 270. In addition, an emulator 107 may be configured to implement certain emulator instructions 271. In FIG. 2 the dashed arrows represent the flow of data between the client 102 and the emulator 107 over the network 160. Alternatively, if the client 102 is contained within the emulator 107, then the dashed arrows may indicate the flow of data over the internal system bus 150'.

Initially at 272, the client 102 delivers game inputs 347 to the emulator 107 over the network 160. By way of example, and not by way of limitation, game inputs 347 may be commands that instruct the emulator 107 where to begin in an emulation routine, or they may be commands that control the game play of a legacy game 106 that is being emulated by the emulator 107. By way of example, and not by way of limitation, a game input 347 that instructs the emulator 107 where to begin in an emulation routine may be in the form of a previously generated snapshot 367. By way of example, and not by way of limitation, game inputs 347 may be automatically generated by the client 102, or they may be provided to the client 102 by an external source. By way of example, the game inputs 347 may be delivered to the emulator 107 all at the same time, or they may be delivered over a period of time.

By way of example, and not by way of limitation, game inputs 347 which control the game play may include commands that are generally used by a game player to advance the legacy game 106 from a first state 301 to a second state 302. The first state 301 may be stored as a first snapshot, and the second state 302 may be the desired location for the generated snapshot. The game inputs 347 may be inputted by a controller 145, or they may be automatically generated by the client 102. Game inputs 347 of this nature may include, but are not limited to, inputs that cause a main character 340 in a legacy game 106 to move to a new position, swing a sword, select an item from a menu, or any other action that can take place during the game play of a legacy game 106. Additionally, while game inputs advance the game play of the legacy game 106 from a first state 301 to a second state 302, there may also be one or more intermediate states generated. Each of the intermediate states may optionally be recorded as a snapshot 367 as well.

Figure 3A:
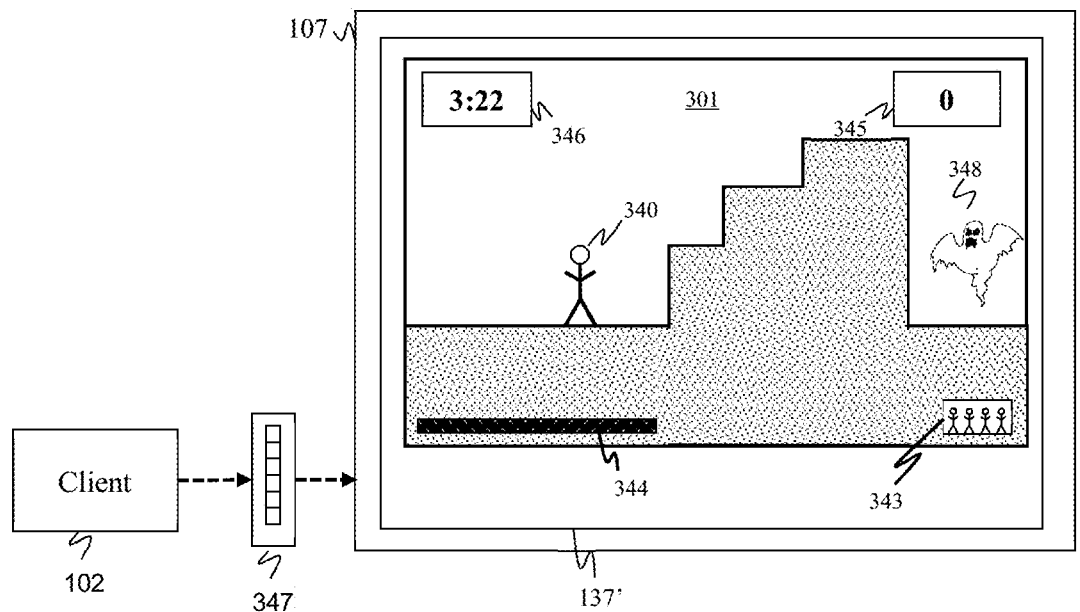
FIG. 3A is a schematic diagram illustrating the process of the client delivering legacy game input data to the emulator according to an aspect of the present disclosure.
Figure 3B:
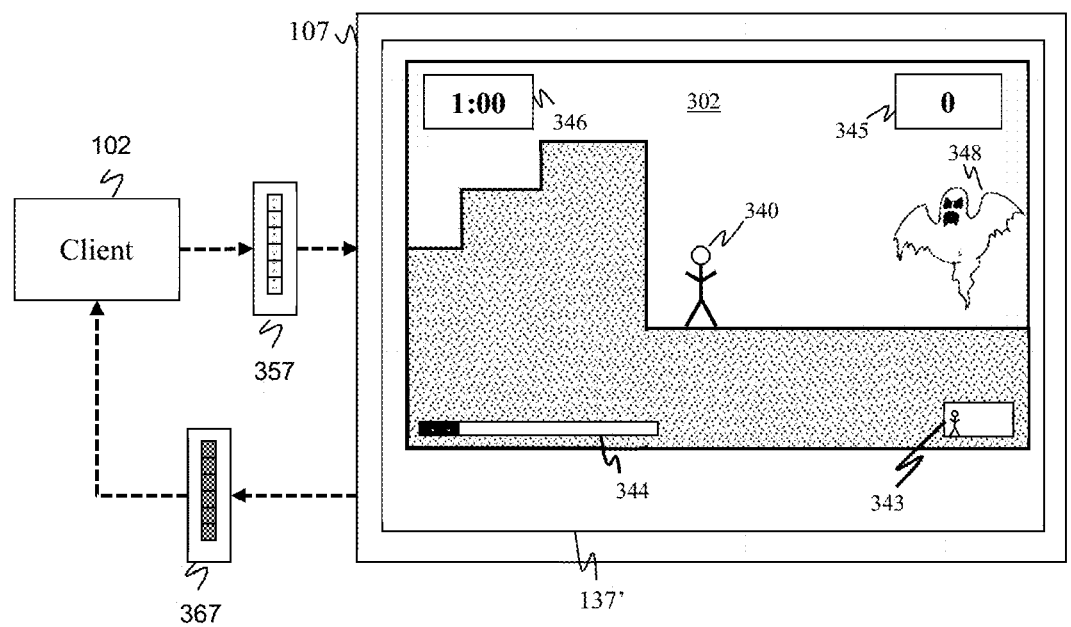
FIG. 3B is a schematic diagram illustrating the process of the client delivering a legacy game suspension request to the emulator, and in response the emulator delivers the snapshot to the client.

The emulator 107 receives the game inputs 347 at 273 and then proceeds to emulate the legacy game 106 in accordance with the game inputs 347 at 274. The emulation of the legacy game 106 causes the game to advance from a first state 301 to a second state 302. By way of example, and not by way of limitation, FIGS. 3A and 3B are schematics of the emulation process according to certain aspects of the present disclosure. FIG. 3A depicts the client 102 delivering game inputs 347 to emulator 107. The first state 301 of the legacy game 106 is displayed on the emulator's display unit 137'. By way of example, the legacy game 106 may alternatively be displayed on the client's display unit 137. According to this example, the first state 301 includes the main character 340 standing on the left side of the mountain and the final boss 348 standing on the right side of the mountain. Additionally, the main character 340 has four lives 343 remaining and his health bar 344 is full. The time remaining to complete the level 346 is displayed on the top left corner of the display unit 137' and the score 345 is displayed on the top right corner of the display unit 137'.

The emulator 107 begins emulating the legacy game 106 according to the game inputs 347 and the game is advanced to a second state 302 as shown in FIG. 3B. In the second state 302, the main character 340 has been moved to the right side of the mountain and is proximate to the final boss 348. Also, the time remaining to complete the level 346 has been reduced to 1:00. Additionally, the health bar 344 indicates that the main character has limited health, and finally, there is only 1 life 343 remaining. These circumstances may be chosen by the client 102 because they present a very challenging scenario for a mini-game. As such, the client 102 may desire a snapshot to be taken at the second state 302.

Once the emulator 107 has advanced the legacy game to the second state 302, the client 102 will deliver a legacy game suspension request 357 to the emulator 107 at 275. By way of example, and not by way of limitation, a legacy game suspension request 357 may be automatically generated by the client 102. Alternatively, an operator of the client 102 may initiate the legacy game suspension request 357 with a keystroke from the user interface 138 or the controller 145. The legacy game suspension request 357 is then received by the emulator at 276.

The emulator 107 begins suspending the legacy game 106 in order to generate the snapshot. The emulator may suspend the legacy game 106 when every device being emulated by the emulator 107 is in a steady state. Waiting for all of the devices to come into a steady state may take as little as one frame to accomplish. Once the devices are in a steady state, the stored data may be platform independent since it does not rely on any specific set of hardware. This enables the snapshot to be used in conjunction with any target platform. The devices being emulated by the emulator 107 may be a steady state when there are no outstanding disk requests and all asynchronous activity has been synchronized. By way of example, and not by way of limitation, these conditions may be met when the emulator 107 has finished processing a basic block. Once the legacy game 106 has been suspended, the emulator 107 may proceed to record the state of every device that is being emulated at 277. By way of example, and not by way of limitation, the emulator may record the state of the CPU, GPU, memory, register values, program counter value, programmable DMA state, buffered data for the DMA, audio chip state, and CD-ROM state. After the snapshot has been generated, the emulator 107 delivers the snapshot to the client at 278, and the client receives the snapshot at 279.

Figure 4A:
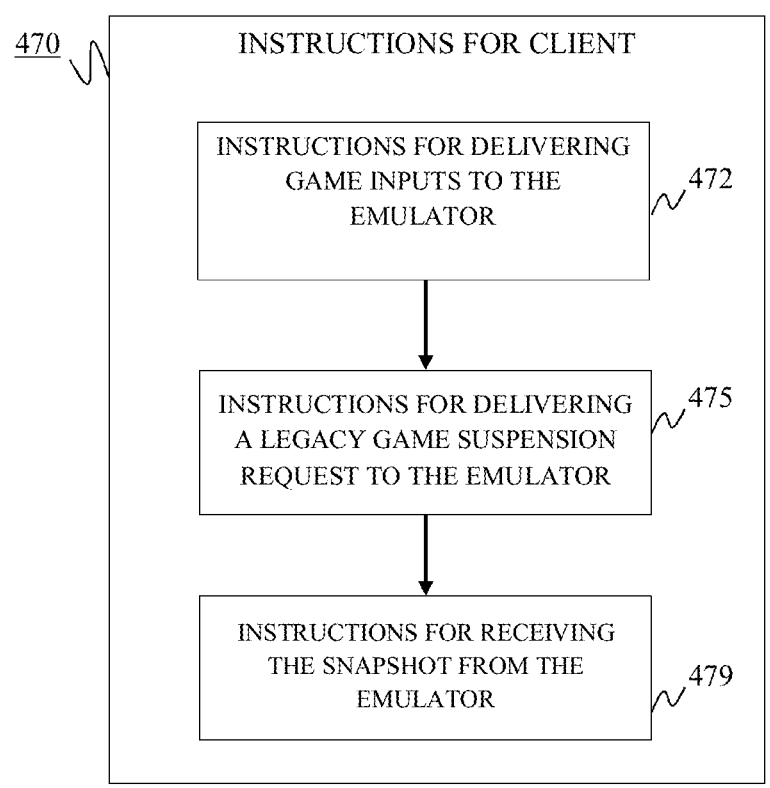
FIG. 4A is a block diagram describing the instructions for how the client receives a snapshot according to an aspect of the present disclosure.

As shown in FIG. 4A, a set of client instructions 470 may be implemented, e.g., by the client 102. The client instructions 470 may be formed on a nontransitory computer readable medium such as the memory 132 or the mass storage device 134. The client instructions 470 may also be part of the process control program 133. The instructions include delivering legacy game input data 347 to the emulator at 472. Thereafter the client 102 is instructed to deliver a legacy game suspension request to the emulator 107 at 475. Thereafter, the client 102 is instructed to receive the snapshot 367 from the emulator 107 at 479.

Figure 4B:
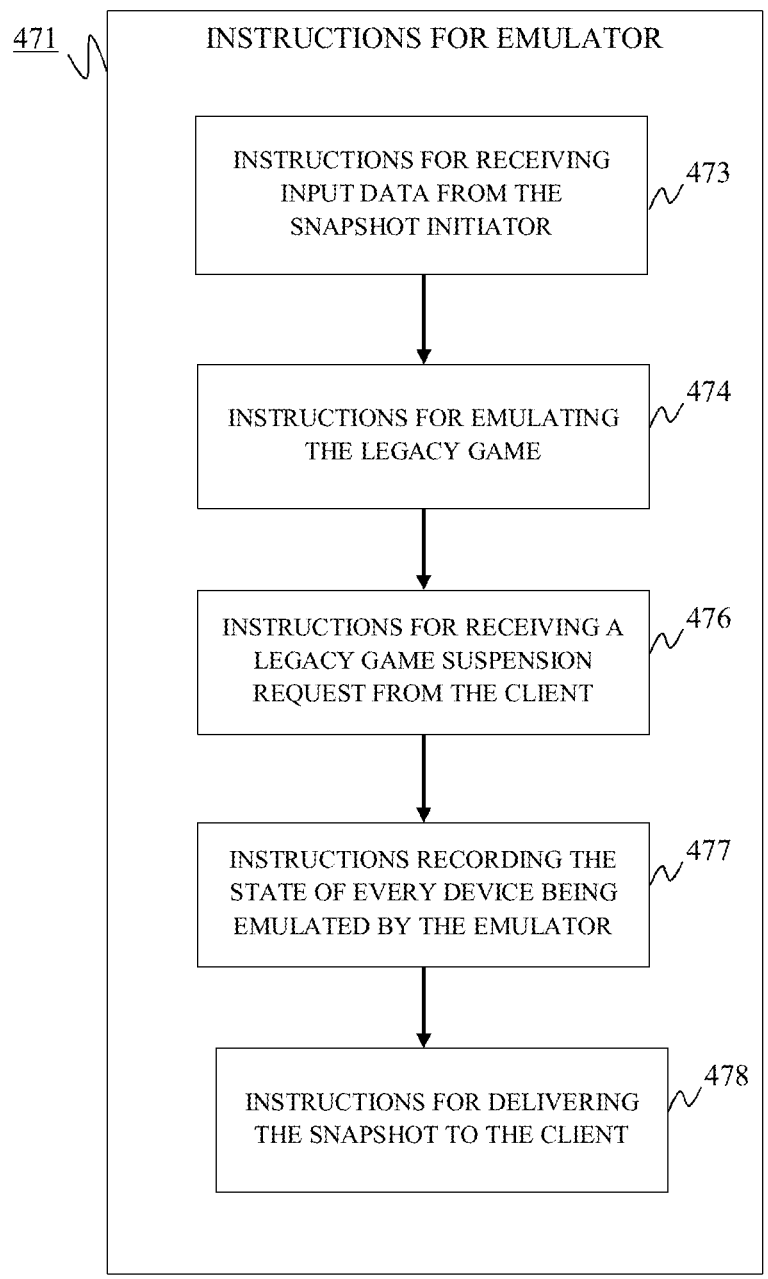
FIG. 4B is a block diagram describing the instructions for how an emulator generates a snapshot according to an aspect of the present disclosure.

As shown in FIG. 4B, a set of emulator instructions 471 may be implemented, e.g., by the emulator 107. The emulation instructions 471 may be formed on a nontransitory computer readable medium such as the memory 132' or the mass storage device 134'. The emulator instructions 471 may also be part of the process control program 133'. The instructions include receiving legacy game input data 347 from the client 102 at 473. Thereafter the emulator 107 is instructed to begin emulating the selected legacy game 106 at 474. While emulating the legacy game 106, the emulator 107 is provided with instructions for receiving a legacy game suspension request 357 from the client 102 at 476. Then at 477, the emulator 107 is instructed to generate a snapshot 367 by recording the state of every device that is being emulated by the emulator 107. The emulator 107 is then instructed to deliver the snapshot 367 to the client at 478.

According to additional aspects of the present disclosure a replay of a mini-game may be made with only a thin input channel. Starting from a snapshot, a script could be written to only record the video and button presses that comprise the game inputs from a person playing the game. Therefore, the replay may be made by simply starting from the original snapshot and playing back the recorded game inputs. This replay method is possible with a deterministic emulator because the emulator will always go through the same sequence of operations when the same game inputs are provided to the emulator.

According to additional aspects of the present disclosure an emulated game may be pre-loaded in order to make the game begin as soon as a user initiates the game. Game players may access the games over a cloud. A server that hosts the titles may create a pre-build buffer so that the server is ready to go as soon as the user clicks "play".

For example, a game may be loaded when a cursor is hovering over a certain game selection on a startup screen. The cloud system could base the decision to load the game on a prediction engine. The prediction engine may predict demand and initiate a sufficient number of host machines to meet the demand. The predictions may be based on what pages users are hovering over or historical data for the demand load for a given game title, e.g., certain game titles may historically have a big demand when school gets out.

For resuming from snapshots, the saved translated code, e.g., from the cache can be used to make the resume run faster. If this cannot be done, the code can be just-in-time (JIT) compiled. Some of this code may use information that is platform dependent. However, in such cases the platform-dependent information can be generated from platform-independent information in the snapshot data. For example, certain host-specific addresses need to be converted. For security, addresses are randomized when a new process starts. These addresses are platform-dependent, but the platform specific addresses could be generated by the host from the platform-independent snapshot data.

According to additional aspects of the present disclosure adaptive load balancing of software emulation of a hardware GPU may be implemented. Normally the rasterization of each line would be assigned to a different thread. However, each line could have a different number of pixels. The emulator doesn't always know how many pixels are needed for each scan line of the screen. So it's difficult to load balance the emulation of the rasterization. To overcome this, the GPU software emulation uses tile-based rasterization. In this type of rasterization small tiles of the screen can be rasterized as opposed to the entire screen. A thread can be assigned to the rasterization of each tile. Tile-based rasterization is efficient for threading because it allows for prediction of how many pixels need to be processed. The emulator can set how many pixels are in each tile and that makes it much easier to load balance since it is known a priori how many pixels are in each tile. It is easier to load balance the rasterization of the tiles than to load balance the lines.

According to additional aspects of the present disclosure in a cloud-based emulation of legacy games it is desirable to run threads independently while reducing latency because the games are going to be served over the cloud. It is desirable to reduce latency within each instance of a game and to reduce latencies when there are multiple instances of the same game on a given server. One source of latency is due to the fact the emulation of the GPU is not currently synchronized with emulation of everything else. Buffering a lot of commands before GPU starts can produce 15 to 30 ms of latency. In order to fix this, the emulator may save time by running things in parallel. For example, the emulator may run GPU emulation in parallel with the CPU emulator. Nominal GPU latency variance may be 20-30 ms. There is also an encoder latency, which has to start about 6 ms after GPU. However, 20 ms of latency may be saved by actually delaying the start of the GPU until after the CPU has processed the first few sets of frames. Certain types of CPU (e.g., the EE on the PS2) may finish the processing of these frames in 10-12 ms. By buffering the CPU output and waiting until it is done before sending the output to the GPU the GPU can be provide with a lot of work that can be run in parallel with the CPU's processing of the next group of frames.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a computer system configured to operate on a network, a method comprising:
   a) receiving one or more game inputs from a remote client over the network, wherein the one or more game inputs advance game from a first state to a second state;
   b) receiving a suspension request from the remote client over the network;
   c) generating a snapshot of a game with the computer system, wherein the snapshot is a recording of a state of one or more devices when each of the one or more devices is in a steady state; and
   d) delivering the snapshot to the remote client over the network.

2. The method of claim 1, wherein the one or more devices are in the steady state when there are no outstanding disk requests.

3. The method of claim 1, wherein the one or more devices are in the steady state when there is no asynchronous activity.

4. The method of claim 1, wherein the suspension request is received before the game has advanced to the second state.

5. The method of claim 1, wherein the one or more game inputs are received over a period of time.

6. The method of claim 1, wherein the computer system includes a deterministic emulator.

7. The method of claim 6, wherein the deterministic emulator uses basic blocks to emulate the game.

8. A nontransitory computer readable medium containing program instructions wherein execution of the program instructions by one or more processors of a computer system causes the one or more processors to carry out the steps of:
   a) receiving one or more game inputs from a remote client over a network, wherein the one or more game inputs advance game play in a game from a first state to a second state;
   b) receiving a suspension request during the game play from the remote client over the network;
   c) in response to the suspension request, generating a snapshot of the game with the computer system, wherein the snapshot is a recording of a state of one or more devices being emulated by the emulator when each of the one or more devices is in a steady state; and
   d) delivering the snapshot to the remote client over the network.

9. A computer system configured to operate on a network, the emulator comprising:
   a processor;
   a memory coupled to the processor;
   one or more instructions embodied in memory for execution by the processor, the instructions being configured to implement a method, the method comprising:
   a) receiving one or more game inputs from a remote client over the network, wherein the one or more game inputs advance game play in an emulated game from a first state to a second state;
   b) receiving a suspension request during the game play from the remote client over the network;
   c) in response to the suspension request, generating a snapshot of the emulated game with the emulator, wherein the snapshot is a recording of a state of one or more devices when each of the one or more devices is in a steady state; and
   d) delivering the snapshot to the remote client over the network.

10. In a client configured to operate on a network, a method comprising:
    a) delivering one or more game inputs to a remote computer system over a network, wherein the one or more game inputs are configured to advance game play in a computer game that is implemented by the remote computer system from a first state to a second state;
    b) delivering a suspension request during the game play to the remote emulator over the network; and
    c) in response to the suspension request, receiving a snapshot of the game from the remote computer system, wherein the snapshot is a recording of a state of one or more devices when each of the one or more devices is in a steady state.

11. The client of claim 10, wherein the suspension request is delivered to the remote computer system before the remote computer system has advanced the game to the second state.

12. The client of claim 10, wherein the one or more game inputs are automatically generated.

13. The client of claim 10, wherein the one or more game inputs received over a period of time.

14. The client of claim 10, wherein the remote computer system includes a deterministic emulator.

15. The client of claim 14, wherein the deterministic emulator uses basic blocks to emulate the game.

16. A nontransitory computer readable medium containing program instructions wherein execution of the program instructions by one or more processors of a computer system causes the one or more processors to carry out the steps of:
    a) delivering one or more game inputs to a remote computer system over a network, wherein the game inputs are configured to advance game play in a computer game that is implemented by the remote computer system from a first state to a second state;
    b) delivering a suspension request during the game play to the remote computer system over the network; and
    c) in response to the suspension request, receiving a snapshot of the game from the remote computer system, wherein the snapshot is a recording of a state of one or more devices when each of the one or more devices is in a steady state.

17. A client configured to operate on a network, comprising:
    a processor;
    a memory coupled to the processor;
    one or more instructions embodied in memory for execution by the processor, the instructions being configured to implement a method, the method comprising:
    a) delivering one or more game inputs to a remote computer system over a network, wherein the game inputs are configured to advance game play in a computer game that is implemented by the emulator from a first state to a second state;
    b) delivering a suspension request during the game play to the remote computer system over the network; and
    c) in response to the suspension request, receiving a snapshot of the game from the remote computer system, wherein the snapshot is a recording of a state of one or more devices when each of the one or more devices is in a steady state.

* * * * *